United States Patent [19]

Musschoot

[11] Patent Number: 5,024,320
[45] Date of Patent: Jun. 18, 1991

[54] VIBRATORY SPIRAL ELEVATOR

[75] Inventor: Albert Musschoot, Barrington, Ill.

[73] Assignee: General Kinematics Corporation, Barrington, Ill.

[21] Appl. No.: 541,487

[22] Filed: Jun. 21, 1990

Related U.S. Application Data

[63] Continuation of Ser. No. 399,350, Aug. 28, 1989, abandoned, which is a continuation of Ser. No. 47,778, May 8, 1987, abandoned.

[51] Int. Cl.$^5$ ............................................. B65G 27/02
[52] U.S. Cl. .................................... 198/756; 198/770
[58] Field of Search ............... 198/770, 766, 756, 752; 209/366.5, 367; 74/61, 87

[56] References Cited

U.S. PATENT DOCUMENTS

| 2,805,841 | 9/1957 | Kyle | 198/756 X |
| 2,847,767 | 8/1958 | Carrier, Jr. | 198/756 X |
| 2,927,683 | 3/1960 | Carrier, Jr. | |
| 2,934,202 | 4/1960 | Roder et al. | |
| 3,053,380 | 9/1962 | Spurlin | |
| 3,407,670 | 10/1968 | Venanzetti | 198/752 X |
| 3,449,969 | 6/1969 | Dorris | 198/766 X |
| 3,789,977 | 2/1974 | Musschoot | |
| 3,882,996 | 5/1975 | Musschoot | 198/770 |
| 4,267,919 | 5/1981 | Schrader | 198/756 |
| 4,495,826 | 1/1985 | Musschoot | 198/770 X |

FOREIGN PATENT DOCUMENTS

| 828219 | 2/1960 | United Kingdom |
| 857250 | 12/1960 | United Kingdom |
| 1144332 | 3/1969 | United Kingdom |
| 1502085 | 2/1978 | United Kingdom |

Primary Examiner—H. Grant Skaggs
Assistant Examiner—Cheryl L. Gastineau
Attorney, Agent, or Firm—Wood, Phillips, Mason, Recktenwald & VanSanten

[57] ABSTRACT

A spiral elevator is described for conveying product from one level to another level up a spiral track. The elevator is powered by a two-mass system having an exciter resiliently supported on the vertical tube. The exciter has a pair of parallel shafts with a vibration generating member mounted on each shaft. A motor is provided for driving each shaft independent of the other shaft. Controls are provided for controlling the vibratory forces generated by the vibration generating members to vary the vibratory forces from substantially zero unbalance to a desired level of unbalance to convey product from the inlet to the outlet of the spiral track.

9 Claims, 1 Drawing Sheet

U.S. Patent  June 18, 1991  5,024,320
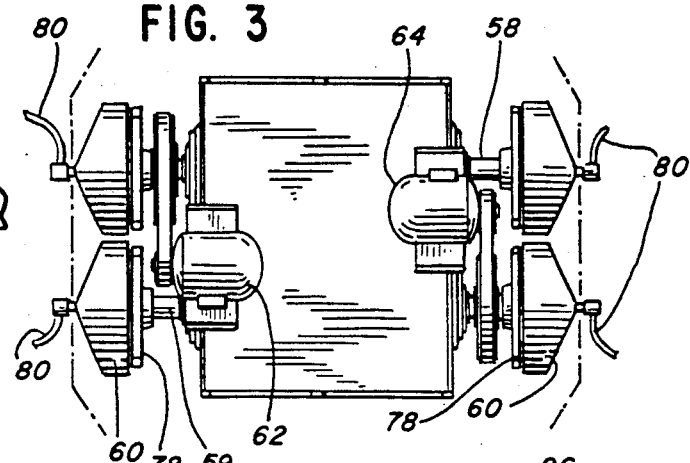
FIG. 2
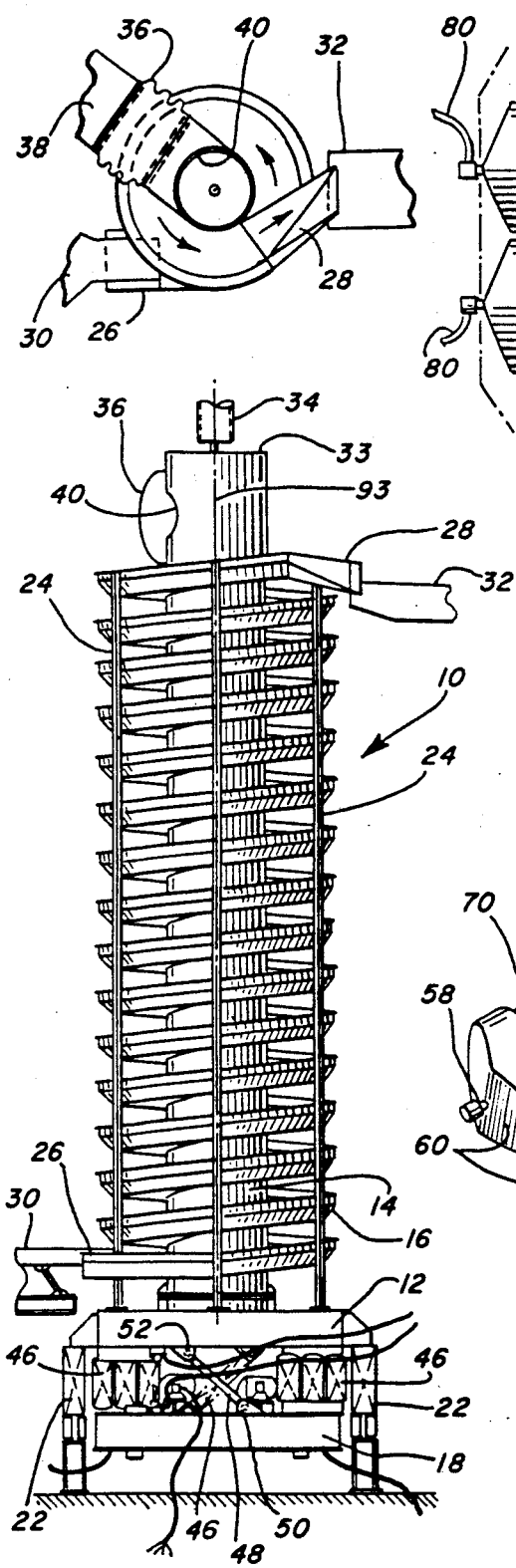
FIG. 1
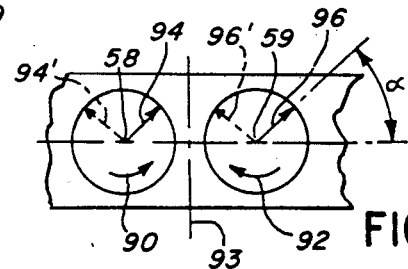
FIG. 3
FIG. 7
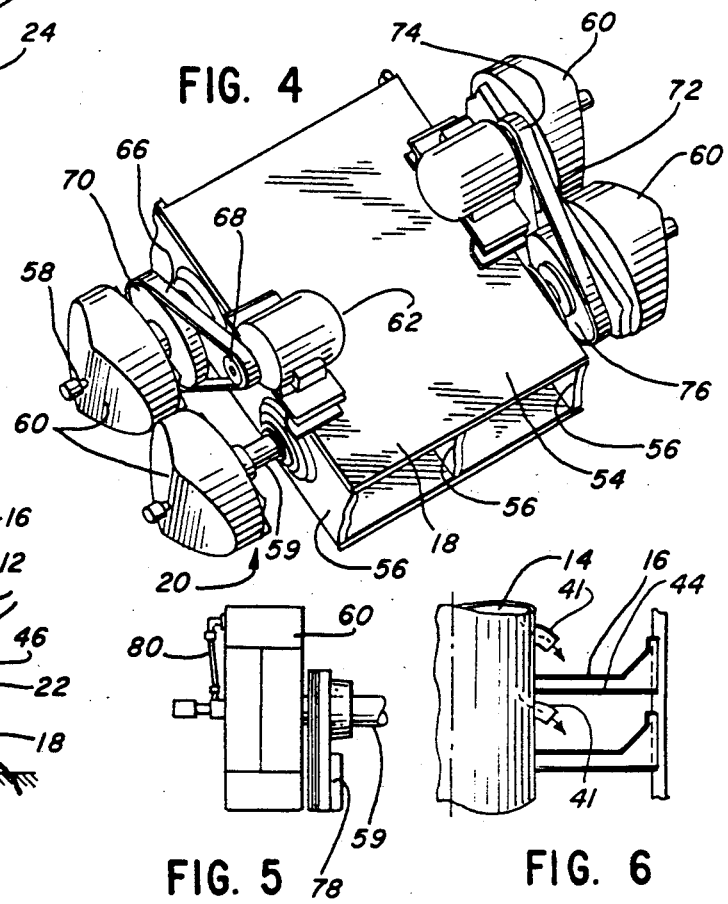
FIG. 4
FIG. 5
FIG. 6

VIBRATORY SPIRAL ELEVATOR

This application is a continuation of application Ser. No. 399,350, filed Aug. 28, 1989, now abandoned which is a continuation of application Ser. No. 047,778, filed May 8, 1987 now abandoned.

FIELD OF THE INVENTION

This invention relates to a spiral ramp vertical elevator utilizing a two-mass vibratory conveyor drive system.

BACKGROUND OF THE INVENTION

Vertical spiral elevators have been known and used for some time. The spiral elevators are driven by vibratory apparatus connected at the top, at the bottom and/or in between. Most such systems utilize brute force connections directly from the vibratory apparatus to the vertical spiral. A typical system is shown in the Carrier U.S. Pat. No. 2,927,683 wherein two parallel shafts are mounted directly on the base of a spiral elevator with differently phased eccentric weights on the shafts. The shafts are simultaneously driven in opposite directions of rotation by a common motor. Other systems are shown in the Roder et al U.S. Pat. No. 2,934,202, the Schrader U.S. Pat. No. 4,267,919 and the Spurlin U.S. Pat. No. 3,053,380. All of these systems require large motors to handle start-up and shutdown of the elevator and, due to the loads on the system, often experience broken drive shafts, worn bearings and the like.

In addition, the current and prior systems generally use constant speed motors and have the eccentric weights in a fixed position on the shafts so that the transient response at start-up and shutdown is very high resulting in frequent burnout of the motors.

Current units are mostly of the brute force type and employ couplings and/or gear boxes to positively drive the two shafts, upon which the eccentrics are mounted, in opposite directions and in a synchronized relationship. These systems require that each unit be preset relative to the other unit so as to get the synchronization desired.

SUMMARY OF THE INVENTION

The present invention provides a new and improved vertical spiral elevator that overcomes the above enumerated problems of the prior art. Specifically, the spiral elevator is driven by a two-mass system with the vibratory force generating apparatus being mounted on an exciter assembly resiliently supported on the spiral elevator main frame. The vibratory force generating apparatus has two parallel shafts with a variable force eccentric member mounted on each end of each shaft. The shafts are separately driven in opposite directions so as to be non-mechanically synchronized. The variable force members are initially set for substantially no unbalanced force so that upon start-up minimum or very small transient response is produced. As the variable force members are loaded to produce an unbalanced or eccentric force on the shaft, a vibratory force will be generated. The non-mechanically connected shafts and eccentrics will be subject to the inertial synchronization phenomenon to obtain proper synchronization of the two drive shafts and eccentric weights. Due to the low or no load start-up of the system and gradual eccentric loading of the variable force vibration generating members, smaller motors can be used and the life cycle of the drive apparatus is substantially extended.

The two-mass system with the particular vibratory force generator resiliently connected to the spiral elevator frame can be adjusted so as to keep material flowing up the spiral ramp and out the discharge at the top. The apparatus is such that the material could be conveyed downward simply by the appropriate setting of the variable force generators.

Controls are provided for the variable force generator so as to adjust the stroke of the eccentric to vary the product conveying speed and residence time.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is an elevational view of an improved spiral elevator showing one preferred form of a two-mass vibration generating apparatus;

FIG. 2 is a top plan view of the spiral elevator of FIG. 1 showing an infeed conveyor and a discharge conveyor;

FIG. 3 is a top plan view of an exciter assembly upon which is mounted the two motor, two shaft vibratory generating apparatus;

FIG. 4 is a perspective view of the exciter assembly and vibratory generating apparatus of FIG. 3;

FIG. 5 is an elevational view of one variable force vibration generating member;

FIG. 6 is a bull's-eye view of a section of the spiral elevator showing an air flow structure.

FIG. 7 is a schematic view of the forces generated by the variable force vibration generators to produce the lift-twist motion.

Referring to the drawings in greater detail and initially to FIGS. 1 and 2, a vertical elevator or tower 10 is shown and includes a base 12, a central tube 14 about which is mounted a spiral track 16, an exciter 18 and a vibration generating apparatus 20. The base 12 is resiliently supported by means of isolation springs or isolation blocks 22 on a floor or other mounting surface. The tube 14 is centrally located on and is affixed to the base and has the spiral track 16 mounted to the outer surface thereof. Several vertical support bars 24 are mounted on the base and are affixed to the outer circumference of the spiral flights so as to support the flights uniformly throughout the height of the spiral track. An inlet trough 26 leads tangentially into the lowermost flight of the spiral track and an outlet trough 28 leads tangentially away from the topmost flight of the spiral track. A conveyor 30, such as a vibratory conveyor, is positioned to move product (i.e. bulk, granular or the like) onto the inlet trough 26. A second conveyor 32 or chute is aligned below the outlet trough 28 to receive and to convey product from the elevator to an appropriate location. It is contemplated that the inlet 26 and outlet 28 could be reversed for conveying material from the higher level to the lower level.

The control tube 14 has a closed end 33 with a stabilizer 34 connected to an overhead support (not shown) so as to hold the axis of the tower vertical without restraining the vibratory conveying motion of the elevator. A flexible air duct 36 connects a source 38 of air, which may be heating air or cooling air, to an inlet 40 in the top portion of the tube. Nozzles 41 communicate from the inside of the tube 14 onto the deck 44 of each flight of the spiral (FIG. 6) to direct air onto the product on the flight. The nozzles can be spaced every so many degrees (i.e. 90°) around the tube so as to provide a sufficient flow of air to cool or to heat the product as the product traverses the spiral track.

A two-mass system is used to provide the vertical conveying motion to the elevator 10. Specifically, as is shown in FIGS. 1, 3, 4 and 5 the exciter 18 is resiliently supported by plural reactor coil springs 46 on the base 12. The central axis of each coil spring 46 angles with respect to the exciter and with respect to the under surface of the base 12. Rocker leg 48 is connected at 50 on the exciter and at 52 on the base and extends at an angle of approximately 45° to the plane of the exciter.

The exciter 18 includes parallel plates 54 supported apart by spacers 56. A pair of shafts 58, 59 are mounted in parallel relationship in bearings in the spacers. A variable force vibration generating device 60 is mounted on each end of each shaft 58, 59. Two separate motors 62, 64 are mounted on the top plate. A belt 66 from a pulley 68 on one motor 62 engages a pulley 70 on one shaft 58 and a belt 72 from a pulley 74 on the other motor 64 engages with a pulley 76 on the other shaft 59. The motors 62, 64 are individually controlled.

The variable force vibration generating devices 60 may be any one of several commercially available types, but the preferred device is shown and described in my U.S. Pat. No. 4,495,826 issued Jan. 29, 1985 and entitled Vibratory Apparatus. The device of the Vibratory Apparatus patent is incorporated herein by reference and will be described in detail. The fixed weight 78 of the two devices 60 on the same shaft, for instance shaft 59, will be in the same relative orientation, that is the center of gravity of the fixed weight will be vertically below the axis of the shaft 59 in FIGS. 3 and 5. The position of the movable weight will be controlled by fluid through the conduit 80 in the shaft 59. At rest, which will be at start up, the movable weight will be positioned to offset the unbalance of the fixed weight 78 so that the motors will start with substantially no unbalanced load. Once the motors are at speed, the movable weight is shifted through use of the controls to admit fluid into the cylinder of the movable weight. The degree of imbalance can be precisely controlled so that the vibratory motion transmitted to the exciter and coil springs 46 will vibrate the base 12 and tower in a vertical and inclined path thereby advancing product up the spiral track 16. The two-mass system is operated at subresonant natural frequency by adjusting the adjustable or variable rate centrifugal force drive. The two parallel drive shafts are not mechanically synchronized so that the inertial synchronization phenomenon is used to obtain proper synchronization of the two shafts. The controls are such that adjustable set points on the instrument permit adjustment of the stroke and, hence, product conveying speed and residence time. The control system compensates for product sticking and regulates the fluid pressure to the movable weights in the variable force generator to hold the preset point stroke.

The controls automatically reduce the unbalances of the vibration generator to minimum values during shutdown and during start up permitting the use of smaller motors with less horsepower and reducing downtime to repair or replace burned out motors.

The counter-rotating shafts with the variable force vibration generating devices 60 on each shaft produces the inertial synchronization illustrated schematically in FIG. 7 with an angle $\alpha$ of impressed force required to produce the "Lift-Twist" motion necessary to convey product up the spiral track 16. In FIG. 7 the two circles 90, 92 illustrate the opposite directions of rotation of the shafts 58, 59 relative to the centerline 93 of the tower, with the centrifugal forces 94, 96 on the near side forming the angle $\alpha$ needed to produce the lift-twist motion desired. The dashed lines 94′, 96′ show the centrifugal force on the far side which also forms the needed angle $\alpha$.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. In a drive for a spiral elevator having a base, isolation means for resiliently supporting the base on a surface, exciter means, means for resiliently supporting the exciter means on the base, said means for supporting the exciter means comprising a plurality of springs each extending angularly between and connected to the base and exciter means and rocker leg means extending angularly between and pivotally connected to the base and to the exciter means, said exciter means having associated therewith a pair of parallel shafts journaled thereon, said exciter means also having associated therewith vibration generating means mounted on each shaft and said exciter means further having associated therewith a pair of motors mounted thereon with one motor driving one shaft independent of the other motor driving the other shaft in resiliently associated relation to said base of said spiral elevator whereby in operation the shafts and vibration generating means reach an inertially synchronized state, whereby vibratory forces from said exciter means are transmitted through the springs to the base and to the spiral elevator and isolated from the support surface.

2. In the drive for a spiral elevator as claimed in claim 1 wherein each vibration generating means has means for varying the forces generated by said vibration generating means.

3. A spiral elevator for conveying product from one level to another level, said spiral elevator comprising a base, means for resiliently supporting said base on a surface, a spiral track mounted on said base and having an inlet at one end and an outlet at the other, exciter means, means for resiliently supporting the exciter means on the base, said means for supporting the exciter means comprising a plurality of springs each extending angularly between and connected to the base and exciter means and rocker leg means extending angularly between and pivotally connected to the base and to the exciter means, said exciter means having associated therewith a pair of parallel shafts journaled thereon, said exciter means therewith unbalanced means mounted on each shaft, and said exciter means further having associated therewith means for driving one shaft and associated unbalanced means independent of the other shaft and unbalanced means in resiliently associated relation to said base of said spiral elevator, whereby vibratory forces from said exciter means are transmitted through the springs to the base and to the spiral elevator and isolated from the support surface.

4. A spiral elevator as claimed in claim 3 wherein said unbalanced means includes means for varying the vibratory forces generated by said independently driven drive shafts.

5. A spiral elevator as claimed in claim 3 wherein said unbalanced means comprises a variable force vibration generating means and wherein pressure is applied to said vibration generating means to vary the vibratory forces.

6. A spiral elevator as claimed in claim 5 wherein separate variable force vibration generating means are mounted on each end of each shaft.

7. A spiral elevator as claimed in claim 3 wherein a central tube is fixed on said base, said spiral track encircles said tube with said inlet at the lower end of the tube and said outlet at the upper end of the tube, said tube having a central axis extending vertically relative to said base.

8. A spiral elevator as claimed in claim 7 wherein means are provided for forcing air into the central tube and nozzle means are provided on the tube for directing said air onto product on the spiral track.

9. A spiral elevator as claimed in claim 3 wherein each unbalanced means has a movable weight controlled by pressure from a remote source for varying the stroke of the unbalanced means to increase or decrease the conveying speed of the product.

* * * * *